United States Patent [19]

Hahn et al.

[11] 3,937,755

[45] Feb. 10, 1976

[54] POLYESTERS HAVING IMPROVED DISPERSE DYEABILITY

[75] Inventors: Maneung Hahn, Akron; Leroy C. T. Lin, Uniontown; William C. T. Tung, Tallmadge, all of Ohio

[73] Assignee: The Goodyear Tire & Rubber Company, Akron, Ohio

[22] Filed: Jan. 23, 1975

[21] Appl. No.: 543,400

[52] U.S. Cl. ............................. 260/860; 260/75 N
[51] Int. Cl.² ................. C08G 63/16; C08L 67/02
[58] Field of Search ..................... 260/860, 75 N

[56] References Cited
UNITED STATES PATENTS

| | | | |
|---|---|---|---|
| 3,397,253 | 8/1968 | Mertens et al. | 260/860 |
| 3,595,938 | 7/1971 | Weissermel et al. | 260/860 |
| 3,624,181 | 11/1971 | Munakata et al. | 260/75 N |
| 3,651,172 | 3/1972 | Barkey et al. | 260/860 |
| 3,856,754 | 12/1974 | Habermeier et al. | 260/75 N |

OTHER PUBLICATIONS

Di–2–Carboxyethyl Dimethyl Hydantoin, S–2572, *Technical Bulletin*, Dantocon TMPCE., Glycol Chemicals Inc., Williamsport, Penn., (1972).

*Primary Examiner*—Murray Tillman
*Assistant Examiner*—Thurman K. Page
*Attorney, Agent, or Firm*—F. W. Brunner; J. M. Wallace, Jr.

[57] ABSTRACT

Polyethylene terephthalate block copolyesters having ethylene terephthalate blocks and hydantoin polymer blocks for improved disperse dyeability and improved antistatic properties. The copolyesters are prepared by conventional methods using blocks of low molecular weight polyethylene terephthalate and hydantoin polyester.

6 Claims, No Drawings

POLYESTERS HAVING IMPROVED DISPERSE DYEABILITY

This invention relates to new copolyester resins and to products therefrom having improved hydrophilicity and antistatic properties.

Fibers of polyester resins such as fibers of polyethylene terephthalate and fibers of copolyesters of terephthalic acid or its derivatives and glycols are known to have generally excellent physical and chemical properties. However, the hydrophobic nature of such fibers imparts some disadvantageous properties such as a tendency to build electrostatic charges on exposure to friction, poor soil release properties and somewhat uncomfortable wearing properties, particularly when worn next to a person's skin.

In the prior art two approaches have been used to try to overcome the hydrophobic properties of fibers such as polyester fibers: (1) treatment of the surface of such fibers with hydrophilic compounds to provide hydrophilic properties, and (2) by incorporation of a hydrophilic agent into the polymer by blending a hydrophilic material into the resin from which the fibers are produced. Fibers lose these agents on repeated laundering or drycleaning and thus lose the hydrophilic properties.

It is a purpose of the present invention provide a block copolyester with a hydrophilic polyester or copolyester resin built in to improve the hydrophilic properties of polyester fibers which are permanent.

In accordance with the present invention it has been found that copolyesters containing a hydantoin of the formula

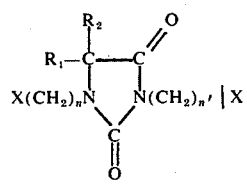

where $R_1$ and $R_2$ are hydrogen, alkyl, aryl, alkaryl, aralkyl and heterocyclic radicals, n and n' are integers from 1 to 10 and X is an ester forming radical such as OH or COOH, incorporated in the polyester resins provide a block copolyester with permanently improved antistatic properties, improved hydrophilicity and improved dyeability with disperse dyes. Representative examples of alkyl radical are methyl, ethyl, propyl, butyl; aryl radicals are phenyl and diphenyl; alkaryl radicals are methyl, phenyl; aralkyl radicals are benzyl and phenethyl and heterocyclic radicals such as tryptophan. Thus the present invention provides fibers which retain the improved characteristics even with repeated laundering or drycleaning.

The representative derivatives of hydantoin are:
di(2-hydroxyethyl) dimethyl hydantoin
di(4-hydroxybutyl) dimethyl hydantoin
di(2-hydroxyethyl) diethyl hydantoin
di(2-hydroxyethyl) dipropyl hydantoin
di(2-hydroxyethyl) ditertiarybutyl hydantoin
di(2-hydroxyethyl) diphenyl hydantoin
di(2-hydroxyethyl) phenyl hydantoin
di(2-hydroxyethyl) methyl phenyl hydantoin
di(2-carboxymethyl) dimethyl hydantoin
di(2-carboxyethyl) dimethyl hydantoin
di(2-carboxypropyl) dimethyl hydantoin
di(4-carboxybutyl) dimethyl hydantoin
di(2-carboxyethyl) diethyl hydantoin
di(2-carboxyethyl) dipropyl hydantoin
di(2-carboxyethyl) ditertiarybutyl hydantoin
di(2-carboxyethyl) diphenyl hydantoin
di(2-carboxyethyl) methyl phenyl hydantoin
di(2-carboxyethyl) benzyl hydantoin
di(2-carboxyethyl) methyl tryptophan hydantoin.

The fibers of the invention are comprised of linear thermoplastic polyester resin in which from 99 to 90 percent of the polymer units are ethylene terephthalate units, the remainder of the units being derived from hydantoin or a derivative of hydantoin.

The following examples illustrate the invention.

EXAMPLE 1

In a reaction flask equipped with a heater, a column, a mechanical stirrer and a nitrogen inlet tube, were charged 27.2 grams of di(2-carboxyethyl) dimethyl hydantoin, 22.7 grams of di(2-hydroxyethyl) dimethyl hydantoin, 0.01 milliliter of sulfuric acid of 30 percent solution in water and 0.05 gram of zinc acetate. The reactor was heated to 210° C. and the pressure was reduced to 0.3 millimeter of mercury pressure.

In three hours a polymer was formed. The product obtained was soluble in warm water and the color was a light tan.

EXAMPLE 2

Forty grams of polyethylene terephthalate having an intrinsic viscosity of 0.70 prepared by conventional ester interchange and condensation using manganese octoate ester interchange catalyst and antimony trioxide and five grams of polyester prepared in Example 1 were blended together under vacuum. The mixture became clear, indicating a reaction had taken place. The product obtained was a highly crystalline fiber forming polymer having an intrinsic viscosity of 0.660 and a melting point of 251° C. as measured by a Differential Scanning Calorimeter.

EXAMPLE 3

The polyester obtained in Example 2 was ground to a 20 mesh size powder. The powder was dried at 140° C. under vacuum over night. (The dried sample was placed in a dessiccator in which a relative humidity of 81 percent was maintained through the use of a saturated ammonium sulfate solution.) After four days the powder absorbed 0.93 percent of moisture, whereas the control polyester powder absorbed only 0.52 percent moisture.

While certain representative embodiments and details have been shown for the purpose of illustrating the invention it will be apparent to those skilled in this art that various changes and modifications may be made therein without departing from the spirit or scope of the invention.

What we claim is:

1. A polyethylene terephthalate block copolyester in which the copolyester comprises a polymer of a derivative of a hydantoin diacid and a hydantoin diol having the general formula

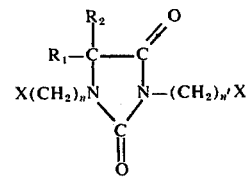

where $R_1$ and $R_2$ are hydrogen, alkyl, aryl, aralkyl and heterocyclic compounds, $n$ and $n'$ are integers from 1 to 10 and X is —OH in the hydantoin diol and —COOH in the hydantoin diacid said copolyester block being present in the polyethylene terephthalate block copolyester in an amount of from 1 to 20 percent by weight of said block copolyester.

2. Block copolyester of claim 1 comprising blocks of polyethylene terephthalate and blocks of a copolyester formed by reacting a compound selected from the group consisting of (A) di(2-hydroxyethyl) dimethyl hydantoin, di(4-hydroxy butyl) dimethyl hydantoin, di(2-hydroxyethyl) diethyl hydantoin, di(2-hydroxyethyl) dipropyl hydantoin, di(2-hydroxyethyl) ditertiary butyl hydantoin, di(2-hydroxyethyl) diphenyl hydantoin, di(2-hydroxyethyl) phenyl hydantoin, and di(2-hydroxyethyl) methyl phenyl hydantoin, with a compound selected from the group consisting of (B) di(2-carboxymethyl) dimethyl hydantoin, di(2-carboxyethyl) dimethyl hydantoin, di(2-carboxyethyl) dimethyl hydantoin, di(4-carboxybuty) dimethyl hydantoin, di(2-carboxyethyl) diethyl hydantoin, di(2-carboxyethyl) dipropyl hydantoin, di(2-carboxyethyl) ditertiary butyl hydantoin, di(2-carboxyethyl) diphenyl hydantoin di(2-carboxyethyl) methyl phenyl hydantoin, di(2-carboxyethyl) benzyl hydantoin and di(2-carboxyethyl) methyl tryptophan hydantoin.

3. The block copolyester of claim 1 in which the copolyester is comprised of blocks of polyethylene terephthalate and blocks of a polymer of di(2-carboxyethyl) dimethyl hydantoin and di(2-hydroxyethyl) dimethyl hydantoin.

4. The polyethylene terephthalate block copolyester of claim 1 in the form of a fiber.

5. The polyethylene terephthalate block copolyester of claim 1 in the form of a film.

6. The polyethylene terephthalate block copolyester of claim 1 in the form of a molded product.

* * * * *